US012749080B2

(12) United States Patent
Metz

(10) Patent No.: US 12,749,080 B2
(45) Date of Patent: Sep. 29, 2026

(54) MULTIMODAL FRAUD DETECTION AND PREVENTION FOR ELECTRONIC PAYMENT PLATFORMS

(71) Applicant: JACK HENRY & ASSOCIATES, INC., Monett, MO (US)

(72) Inventor: Benjamin Metz, Cedar Falls, IA (US)

(73) Assignee: JACK HENRY & ASSOCIATES, INC., Monett, MO (US)

( * ) Notice: Subject to any disclaimer, the term of this patent is extended or adjusted under 35 U.S.C. 154(b) by 83 days.

(21) Appl. No.: 18/772,102

(22) Filed: Jul. 12, 2024

(65) Prior Publication Data

US 2025/0029107 A1 Jan. 23, 2025

Related U.S. Application Data

(60) Provisional application No. 63/528,051, filed on Jul. 20, 2023.

(51) Int. Cl.
*G06Q 20/40* (2012.01)

(52) U.S. Cl.
CPC ................................ *G06Q 20/4016* (2013.01)

(58) Field of Classification Search
CPC .................................................. G06Q 20/4016
See application file for complete search history.

(56) References Cited

U.S. PATENT DOCUMENTS

| | | | |
|---|---|---|---|
| 8,762,263 | B2 | 6/2014 | Gauthier et al. |
| 9,147,042 | B1 | 9/2015 | Haller et al. |
| 9,361,619 | B2 | 6/2016 | Varadarajan et al. |
| 9,400,589 | B1 | 7/2016 | Wasser et al. |
| 9,886,693 | B2 | 2/2018 | Song et al. |
| 10,270,808 | B1 | 4/2019 | Sherif et al. |
| 10,365,805 | B2 | 7/2019 | Mande et al. |
| 10,521,798 | B2 | 12/2019 | Song et al. |

(Continued)

OTHER PUBLICATIONS

Facilitating Fraud: How Consumers Defrauded on Zelle are Left High and Dry by the Banks that Created It, Prepared by the Office of Sen. Elizabeth Warren, Oct. 2022, 14 pages.

*Primary Examiner* — Paul S Schwarzenberg
(74) *Attorney, Agent, or Firm* — Polsinelli LLP

(57) ABSTRACT

In one example, the disclosed multimodal fraud prevention techniques are employed by an intermediary settlement platform. The intermediary settlement platform generally monitors transaction data associated with various payment rails and provides new store and forward functions, which include receiving new customer transactions before they reach core services associated with a Financial Institution (FI); executing new transactions as predicted transactions; extracting behavior metrics from the predicted transactions; quantifying predicted fraud prior to settlement (e.g., before transferring funds) using comprehensive customer identity behavior models; and performing fraud interventions based on the same. In this example, the intermediary settlement platform creates the customer identity behavior models and transforms the customer's transaction data into comprehensive behavior metrics according to the dimensions of the respective model; quantifies the customer behaviors for new transactions; and determines the degree of predicted behavior conformance between the new transaction and non-fraudulent customer behavior metrics.

18 Claims, 11 Drawing Sheets

(56) References Cited

U.S. PATENT DOCUMENTS

| | | | | |
|---|---|---|---|---|
| 10,991,062 | B2 | 4/2021 | Song et al. | |
| 11,658,964 | B2 | 5/2023 | Yarabolu | |
| 11,727,406 | B2 * | 8/2023 | Hearty | G06F 21/577 705/35 |
| 11,887,172 | B2 * | 1/2024 | Venkatasubramaniam | G06Q 30/0609 |
| 12,124,435 | B1 * | 10/2024 | Alves | G06F 16/2379 |
| 2018/0025422 | A1 * | 1/2018 | Dhala | G06Q 20/24 705/38 |
| 2018/0181962 | A1 * | 6/2018 | Barnhardt | G06Q 20/4016 |
| 2023/0107703 | A1 * | 4/2023 | Zhang | G06N 20/00 705/39 |
| 2024/0211966 | A1 * | 6/2024 | Hosseinali | G06Q 30/0185 |

* cited by examiner

600

MULTIMODAL FRAUD DETECTION AND PREVENTION FOR ELECTRONIC PAYMENT PLATFORMS

TECHNICAL FIELD

The present disclosure relates generally to electronic payment systems, and more particularly, to fraud detection and prevention for digital payment platforms.

BACKGROUND

Benjamin Franklin's words "[r]emember that time is money" from his 1748 essay titled "Advice to a Young Tradesman" underscore the foundation, development, and evolution of modern digital transactions, which often occur near instantaneously over a network such as the Internet. Indeed, the modern electronic infrastructure for facilitating such digital transactions typically includes a complex network of interconnected electronic systems and payment channels or "rails" (e.g., Automated Clearing House (ACH), FedWire, Zelle, FedNow, cryptocurrency networks, etc.) that attempt to improve transaction speed and reduce settlement friction. However, the growth and scale of the modern electronic payment architecture has led to a corresponding increase in transaction risk due to fraud, scams, cybersecurity issues, and so on.

Financial institutions and governments alike have attempted to reduce this transaction risk and improve the overall security across electronic payment platforms through various rules, regulations, laws, and partnerships, but often at the cost of efficiency and delayed transaction settlement time. In addition, conventional fraud detection processes are often modeled after traditional in-person transactions such as a customer physical presenting identification to a bank-teller, which do not appreciate the scale of compromised digital accounts nor protect against ever more sophisticated socially engineered fraud schemes, where customers are scammed into authorizing transactions based on false pretenses. Accordingly, a paradigm shift is needed to address the evolving challenges relating to modern fraud, reduce electronic transaction risks, improve transaction security across digital payment platforms, and balance the tension between robust fraud prevention and efficient transaction settlement.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Overview

While various embodiments of are discussed in detail below, it should be understood that descriptions of specific examples are provided for purposes of illustration and discussion, not limitation. Moreover, a person skilled in the relevant art will recognize that additional components, devices, servers, configurations, and so on may be used without departing from the spirit and scope of the disclosure.

In one example configuration, an intermediary settlement platform includes a multimodal fraud prevention system that communicates over a network with one or more electronic payment platforms. In this example, the multimodal fraud prevention system creates a customer profile that includes one or more customer identity behavior models to represent customer behavior associated with one or more registered devices and with non-fraudulent transactions. The system further monitors electronic payment rails and receives transaction data associated with a new customer transaction. In this context, the system receives (e.g., intercepts or directs) the transaction data to the intermediary settlement platform for fraud detection processing before the transaction data reaches any core services associated with a Financial Institution. Notably, as discussed in detail below, the system is further configured to execute the new customer transaction as a predicted transaction at the intermediary settlement platform, where the system converts at least a portion of the transaction data into new respective behavior metrics. The system is further configured to perform fraud detection by quantifying a degree of predicted behavior conformance between the new respective behavior metrics and expected customer behavior associated with at least one of the customer identity behavior models; generate a predicted transaction fraud score (which can include an image) based on the degree of predicted behavior conformance between the new respective behavior metrics and the expected customer behavior according to the dimensions of the customer identity behavior model(s); and perform fraud interventions based on the same. Importantly, the customer identity behavior models are agnostic to the payment rail or transaction mode because the models quantify and contextualize the customer's collective behavior across every rail or mode.

DESCRIPTION

Figure 1A:
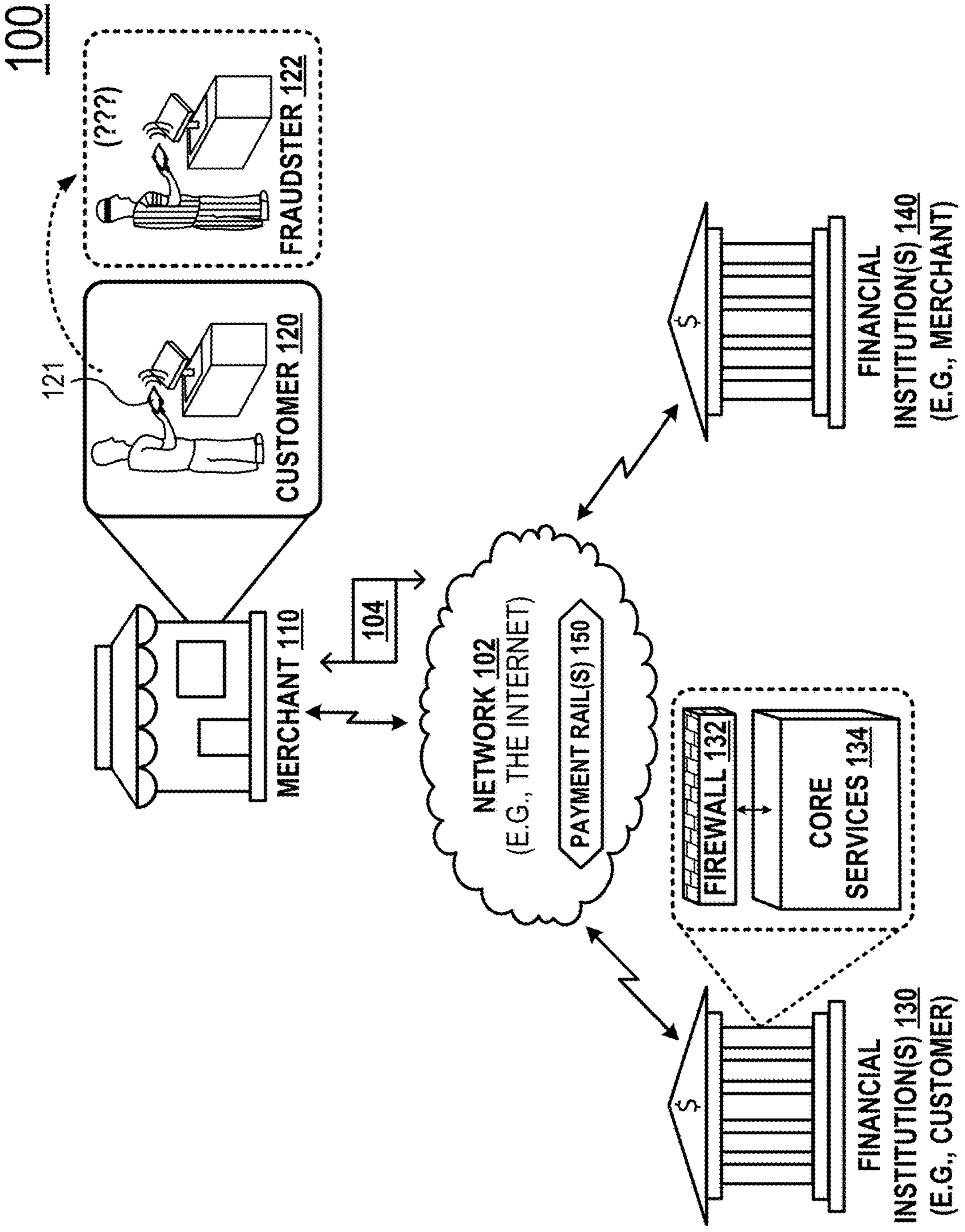
FIG. 1A illustrates a schematic diagram of an example electronic payment environment.

Referring to the figures, FIG. 1A illustrates a schematic diagram 100 of an example electronic payment environment that includes a merchant 110, a customer financial institution (FI) 130, a merchant FI 140 (which can represent an online institution), and a communication network 102 (e.g., the Internet). As shown, network 102 can include electronic payment networks and corresponding payment rails 150 (e.g., Automated Clearing House (ACH), Fedwire, Card, Real Time Payments (RTP), Zelle, FedNow, cryptocurrency networks, etc.). It is appreciated that references to payment "rails" herein generally refers to the underlying network infrastructure for facilitating the transfer of funds between parties or financial institutions. Moreover, it is appreciated that the illustrated environment is provided for simplicity and discussion of an electronic transaction, and further, the systems, devices, and network shown in FIG. 1A typically include additional supporting infrastructure such as interconnected nodes, devices, links, protocols, and so on. It is also appreciated that servers, processors, databases, etc. associated with each FI can include physical hardware at a centralized location and/or remote hardware provisioned in a cloud-computing datacenter or distributed computing network.

As illustrated, portions of underlying hardware and software infrastructure for customer FI 130 include core services 134 as well as a firewall 132. Core services 134 represent essential day-to-day functions for customer FI 130 and can include services relating to deposits, loans, managing customer accounts, processing transactions, money transfers, and so on. Notably, core services 134 is separated from other non-core services and third-party access by firewall 132 because core services 134 often handle sensitive financial data that require additional layers of control and security.

At a high level, FIG. 1A illustrates the flow of an electronic or non-cash transaction, where a customer 120 initiates a purchase of goods/services from merchant 110. During this transaction, merchant 110, customer FI 130, and merchant FI 140 communicate and exchange transaction data such as data packets 104 over corresponding payment rails 150 in network 102. For example, customer 120 provides transaction data such as electronic payment information to merchant 110 (e.g., at a point-of-sale (POS) terminal) using a debit card, a credit card, a digital wallet in a mobile phone 121, and so on. Merchant 110 communicates the transaction data to customer FI 130 through its payment processor (e.g., PayPal, Stripe, Square, Verifone, etc.) over the appropriate payment rail 150. Customer FI 130 then receives the transaction data at core services 134, which ultimately settle the transaction and transfer money from the customer's account at FI 130 to a merchant's account at merchant FI 140.

Notably, transactions typically settle in different timeframes depending on the transaction type, payment processors, layers of network interconnectivity, clearing houses, backend processing, etc. For example, a debit card transaction at a POS terminal may quickly settle or clear the customer's account at FI 130 because POS systems and payment processors often connect directly to an FI or banking network. For example, in a debit transaction, merchant 110 receives the customer's debit-related electronic payment information and sends an authorization request to customer FI 130 to verify sufficient funds in the customer's account. Once verified, merchant 110 sends the transaction data (e.g., customer account number, transaction amount, merchant data, etc.) over the appropriate payment rail 150 (e.g., ACH) for clearing and settlement between customer FI 130 and merchant FI 140.

In addition, with respect to transferring money, it is appreciated that an FI may further batch or aggregate transactions (e.g., ACH payments) for end of day (EOD) processing to streamline and settle multiple transactions between FIs and further, the FI may also leverage federal reserve banks (not shown) to settle transactions. To complete or settle a transaction, customer FI 130 ultimately transfers money from the customer's account (at customer FI 130) to the merchant's account at merchant FI 140.

As another example, credit card transactions often require additional processing steps and may take longer to settle than debit card transactions. In this example, merchant 110 receives credit-related electronic payment information and sends an authorization request to customer 120's credit-card issuer, which may or may not be the same entity as customer FI 130. The credit-card issuer evaluates the authorization request based on available credit for customer 120, account status, and so on, and then approves/declines the authorization request as appropriate. If approved, merchant 110 begins the settlement process over a credit card payment rail to transfer money from customer 120's credit account (with the credit-card issuer) to the merchant's account at merchant FI 140. Notably, in this example, customer 120 will later initiate another payment transaction to transfer money from customer FI 130 to its credit card issuer to settle its credit balance.

Regardless of transaction type, electronic payment networks are susceptible to fraud, as shown by a fraudster 122. While FIs, payment processors, and credit-card issuers are typically required by law, rule, or policy to implement fraud detection processes, such fraud detection processes are often limited to a specific type or subset of a given customer's collective transactions and typically attempt to resolve fraudulent transactions post-settlement or after money transfers from the customer's bank account.

For example, in an account takeover situation, fraudster 122 obtains account information and passwords for customer 120 and performs a fraudulent transaction to transfer money from the customer 120's account to fraudster 122. In this example, conventional fraud detection processes would not address or resolve the fraudulent transaction until after the transaction is complete, or after money transfers from customer FI 130 to a fraudster FI, and/or after merchant 110 provides goods/services to fraudster 122. Indeed, recent Banking Committee hearings in 2022 highlight this issue and the cost of fraud borne by consumers in the context of fraudulent Zelle transactions. At bottom, transferred money, rendered services, and already provided goods are often not recoverable because fraudsters are difficult to locate and cash out immediately after any money transfers.

Figure 1B:
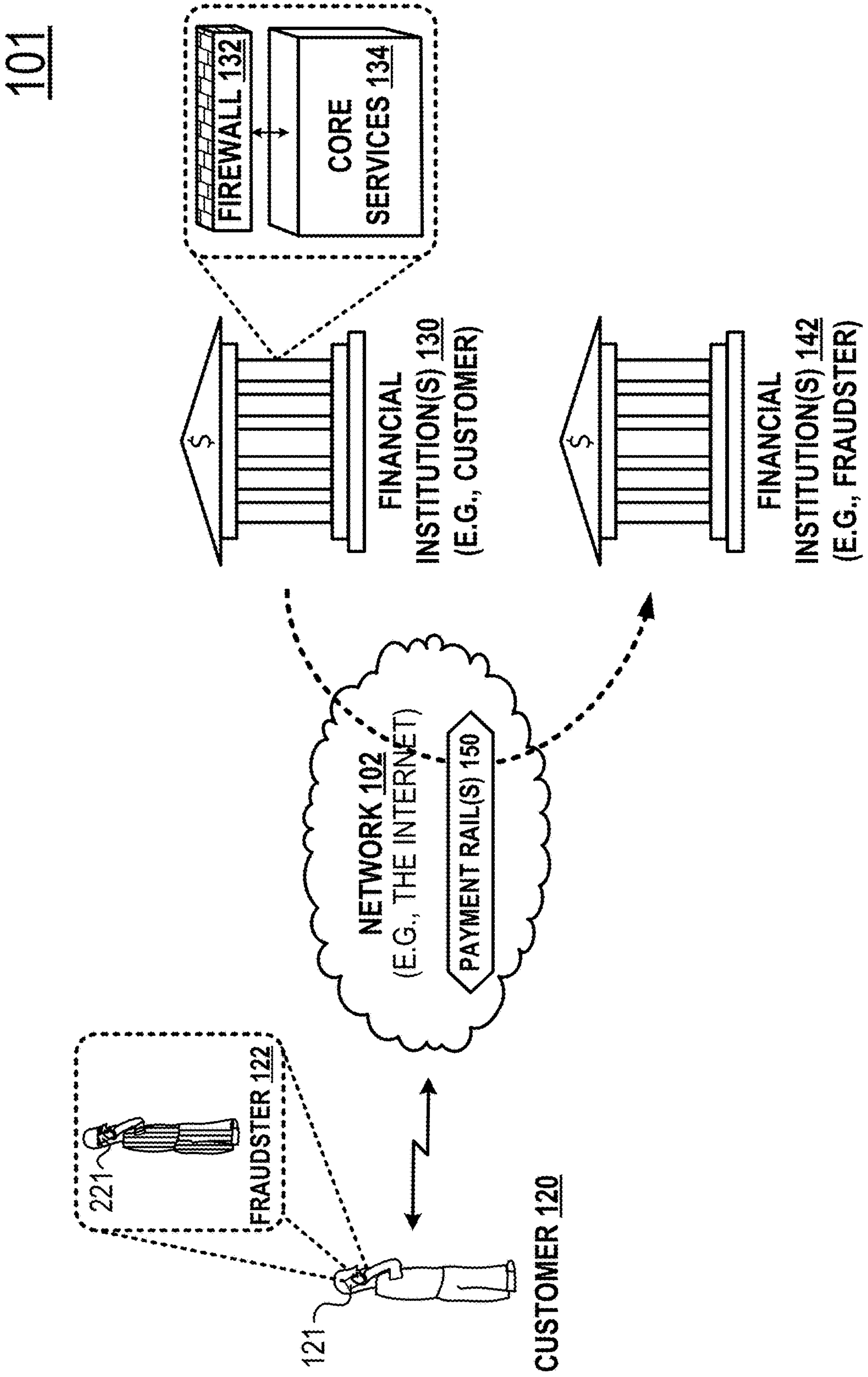
FIG. 1B illustrates a schematic diagram of an example socially engineered fraudulent transaction.

FIG. 1B illustrates a schematic diagram 101 of socially engineered fraud. Socially engineered fraud generally refers to situations where a fraudster employs social engineering tactics to manipulate a customer into providing confidential information (e.g., usernames, passwords, PINs, etc.) or manipulating the customer to authorize a transaction based on a false pretext (e.g., scams, spoofing, offers to sell nonexistent goods, etc.).

In this example, fraudster 122 builds trust with customer 120 and manipulates customer 120 into authorizing one or more fraudulent transactions at customer FI 130. Here, customer 120 instructs customer FI 130 to transfer money to the fraudster's account at a fraudster FI 142 based on a false pretense. Fraudster 122 immediately cashes after money transfers to fraudster FI 142, which makes it difficult if not impossible to reverse the transaction or recover the money. In this situation, fraudster 122 overcomes and bypasses conventional fraud prevention processes such as 2 Factor Authorization (2FA) because fraudster 122 convinces customer 120 to authorize the transaction using customer's registered device—e.g., the customer's mobile phone 121.

Notably, in similar fraud situations, fraudster 122 may steal the customer's mobile phone 121 (which includes the customer's credentials) and/or fraudster 122 can manipulates customer 120 into registering fraudster's mobile device 221 as a new authorized device at customer FI 130. The end result is the same in the above examples: FI 130 approves the fraudulent transaction and transfers money because FI 130 receives the correct credentials for a registered device associated with customer 120. In yet further fraud schemes, fraudster 122 can manipulate customer 120 to physically travel to customer FI 130, present valid ID, and authorize an in-person transaction that transfers money to fraudster FI 142.

As discussed, conventional fraud detection techniques often fail to protect against sophisticated electronic fraud because conventional anti-fraud processes are often modeled after traditional in-person banking transactions, are developed for a specific transaction type, and only attempt to address fraud post-settlement or after money transfers out from the customer's account. For example, sophisticated electronic fraud can be difficult to detect and prevent due in part to the limited visibility for FIs, credit-card issuers, payment processors, etc., which often only monitor specific transaction types. This leads to narrow fraud detection processes for specific transaction types and often results in different fraud prevention processes for different transaction types. In fact, the same FI often employs different fraud processes for different transaction types depending on when the FI implemented additional network infrastructure for supporting "newer" transaction types. These disparate anti-fraud processes fail to protect against modern transaction fraud because they fail appreciate a customer's collective transaction behavior. Accordingly, the multimodal fraud detection techniques disclosed herein provide a new intermediary settlement platform or digital core at a customer's FI that evaluates the customer's transactions across multiple modes (e.g., in-person, online, debit, credit, etc.), creates comprehensive predictive identity behavior models, and leverages these predictive identity behavior models to intervene and prevent fraudulent transactions before money transfers out of the customer's account.

Figure 2:
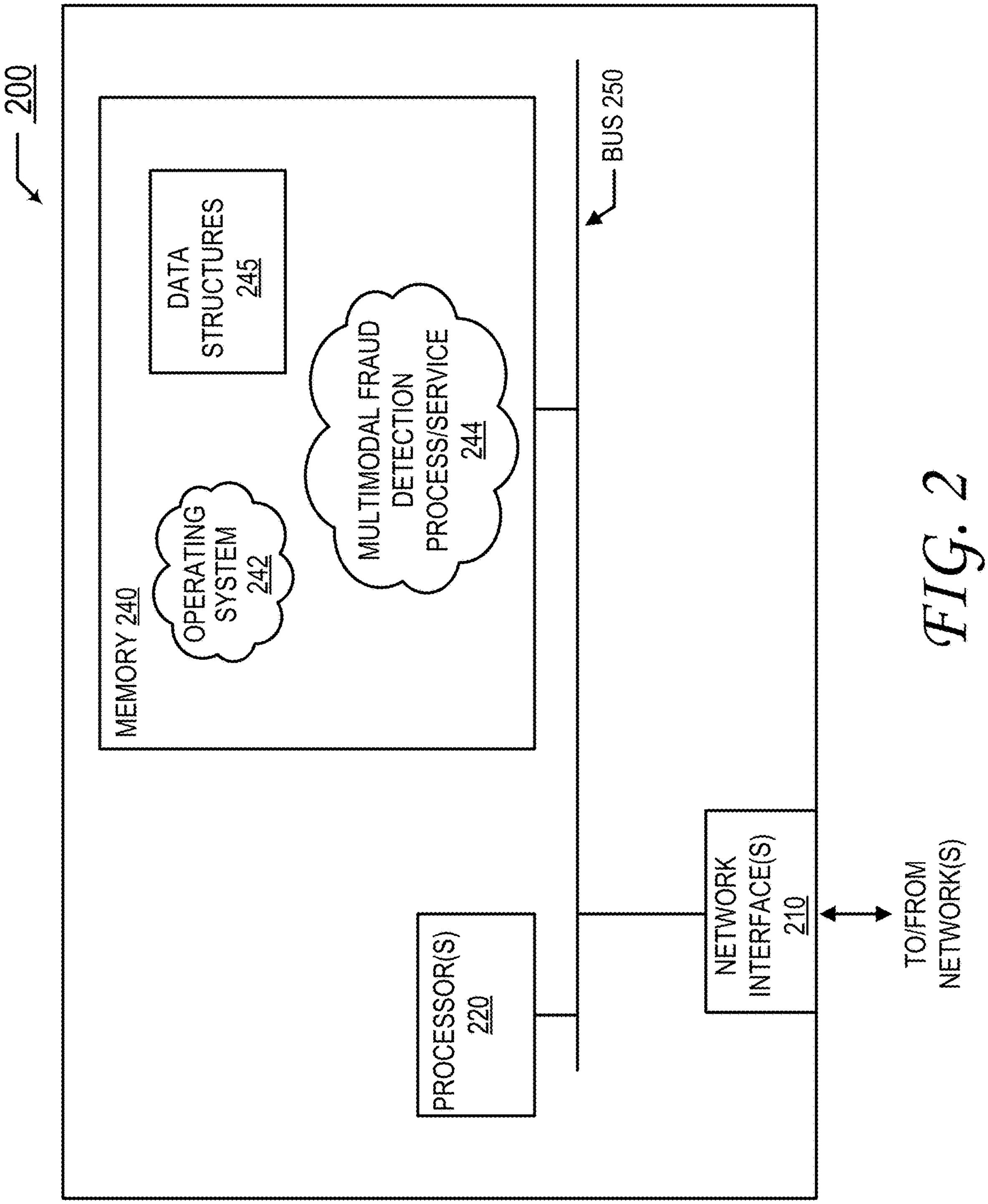
FIG. 2 illustrates a schematic diagram of an example multimodal fraud detection device.

FIG. 2 is a schematic block diagram of an example fraud detection device 200 that may be used with one or more embodiments described herein. In one example, device 200 may be incorporated in an intermediary settlement platform that communicates with core banking services. Device 200 comprises one or more network interfaces 210 (e.g., wired, wireless, PLC, etc.), at least one processor 220, and a memory 240 interconnected by a system bus 250.

Network interface(s) 210 contain the mechanical, electrical, and signaling circuitry for communicating data in a network such as external payment networks as well as internal networks within an FI. Accordingly, network interface 210 may be configured to transmit and/or receive data using a variety of different communication protocols. Memory 240 comprises storage locations addressable by processor 220 (and network interfaces 210) for storing software programs or instructions and data structures associated with the examples described herein.

Processor 220 includes hardware elements or hardware logic adapted to execute software programs and manipulate data structures 245. An operating system 242, portions of which are typically resident in memory 240 and executed by the processor, functionally organizes the device by, inter alia, invoking operations in support of software processes and/or services executing on the device. These software processes and/or services include an illustrated multimodal fraud detection process/service 244, as described herein. In this example, multimodal fraud detection process 244 is shown in centralized memory 240, however it is appreciated that the process may be configured to provision computing resources and operate in a cloud-computing datacenter and/or a distributed computing network. It will also be apparent to those skilled in the art that other processor and memory types, including various computer-readable media, may be used to store and execute program instructions pertaining to the techniques described herein. Importantly, as discussed herein, the various fraud prevention processes may be embodied as modules, sub-processes, sub-modules, engines, routines, or sub-routines and in this context, these terms may be interchangeable and generally refer to interrelated software components/functions.

Figure 3:
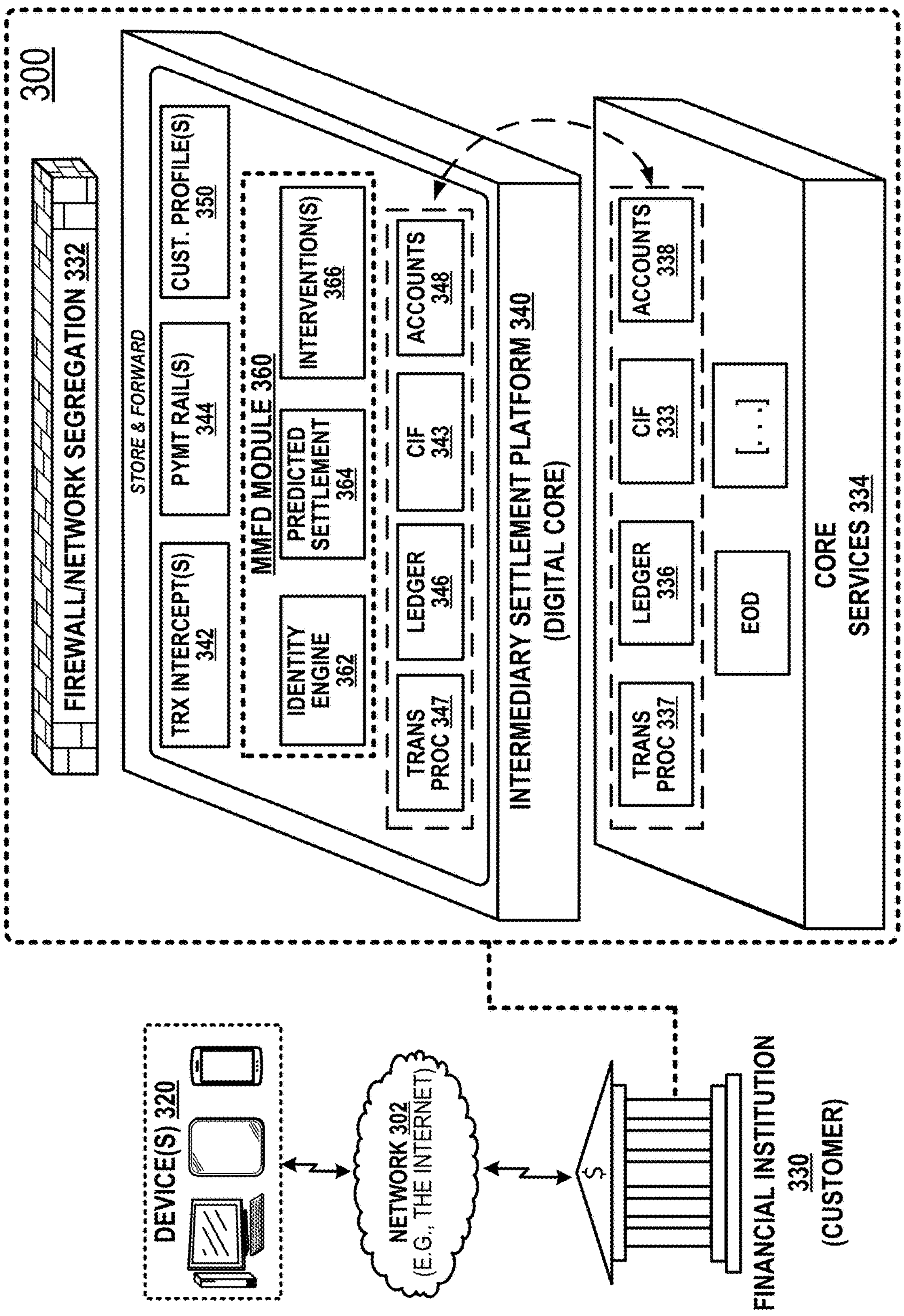
FIG. 3 illustrates a schematic diagram of a financial institution (FI) architecture, showing a core services layer and an intermediary platform or digital core layer that includes a multimodal fraud detection module and customer profiles.

FIG. 3 illustrates a schematic diagram showing a financial institution (FI) 330 having an FI architecture 300. FI architecture 300 includes a firewall 332 (or network segregation layer), an intermediary settlement platform 340, which can form part of a digital core, and core services 334. Firewall 332 generally provides network security functions for controlling and monitoring network traffic to and from sensitive core systems. For example, firewalls generally enforce access controls and restrict external connections between public-facing banking systems (e.g., online banking systems) and the core infrastructure systems. Notably, network segregation techniques can also provide similar access control and security functions. For example, architecture 300 can isolate and segregate internal banking networks and associated systems according to different assigned Virtual Local Area Networks (VLANs).

Core services 334 represents core banking services at FI 330. As shown, core services 334 include a customer information file (CIF) 333, ledger 336, transaction processing 337, accounts 338, end of day (EOD) processing, and so on. CIF 333 represents customer records and can include personal information, addresses, account details (e.g., numbers, types, status, ownership structure, etc.), financial history, communication history (e.g., customer service inquiries, requests, etc.), credit scores, credit limits, loan applications, identity verification documents (e.g., passport, driver's license, etc.), employment and income information, regulatory compliance information (e.g., data required for anti-money laundering (AML) and know your customer (KYC) regulations, etc.). Ledger 336 represents central accounting services such as recording and managing financial transactions and account balances. Transaction processing 337 represents functions for executing financial transactions, including transaction initiation, authorization, settlement, and post-settlement services. Accounts 338 represents core services relating to opening, closing, and managing customer accounts (e.g., transaction history). Notably, EOD services represent activities performed to close the business day such as transaction posting, account reconciliation, batch processes (e.g., ACH), clearing and settlement, reporting and audit, and so on.

Intermediary settlement platform 340 provides new store-and-forward functions that form part of a digital core layer located behind firewall 332 (and/or behind network segregation layers). Importantly, intermediary settlement platform 340 represents a centralized layer that generally receives or intercepts transactions across various payment rails and performs real-time fraud detection, prevention, and intervention before the transaction reaches core services 334. In this context, store-and-forward refers to processes and functions that independently operate from core services 334. Intermediary settlement platform 340 may be provisioned or instantiated by allocating compute, storage, and networking resources.

In operation, intermediary settlement platform 340 creates comprehensive customer profiles that contextualize customer transactions and model the collective behavior of each customer across various transaction types, modes, or payment rails, evaluates the impact of a predicted or trial settlement for each transaction, predicts a degree of fraud for any new transactions, and intervenes at the intermediate network layer or digital core before money transfers out of the customer's account at FI 330.

As shown, intermediary settlement platform 340 includes modules relating to transaction intercepts 342, payment rails 344, customer profiles 350, and a multimodal fraud detection (MMFD) module 360. Transaction intercepts 342 intercept or receive transaction data associated with new payment transactions before it reaches core services 334. Here, transaction intercepts 342 communicate with and monitor payment rails 344, which can provide Application Program Interfaces (APIs) to various payment channels or rails (e.g., Automated Clearing House (ACH), FedWire, Zelle, FedNow, in-person, etc.). In some examples, transaction intercepts 342 monitor payment rails 344 for new transaction requests and identify new transaction requests by messages, data packets, flags, or identifiers such as a check balance. It is appreciated that check balance indicators may identify the transaction data for new transactions because new transactions typically require a preliminary check balance operation. In some embodiments, transaction intercepts 342 may look for other indications to identify the transaction data for new transactions. Once detected, transaction intercepts 342 divert the new transaction request and related transaction data to intermediary settlement platform 340 where MMFD module 360 performs fraud prevention operations.

MMFD module 360 generally represents fraud prevention functions such as multimodal fraud detection process/service 244 shown in FIG. 2 (discussed above). Here, MMFD module 360 organizes its processes into sub-modules shown in a dotted line box, which include an identity engine 362, a predicted settlement 364, and interventions 366. As discussed, it is appreciated that the modules and sub-modules are shown for purposes of illustration and discussion, not limitation, and further the processes and functions associated with these sub-modules can be organized in any number of modules/sub-modules without departing from the spirit of this disclosure.

MMFD module 360 also communicates with other modules in intermediary platform 340 as well as modules in core services 334 as discussed herein. As one example, MMFD module 360 communicates with customer profiles 350, which include customer specific predictive identity behavior models shown in FIG. 5 (discussed below).

Still referring to FIG. 3, intermediary settlement platform 340 further provides a set of intermediate core banking services that include transaction processing 347, ledger 346, CIF 343, and accounts 348. These intermediate core banking services represent intermediate layer analogues of corresponding core services 334, which are shown in respective dash-line boxes. These intermediate core banking services provide functions and transaction data required to perform a predicted or trial transaction settlement at intermediary settlement platform 340 without disrupting or interfering with the corresponding core banking services on core services 334. Importantly, intermediary settlement platform 340 communicates with core services 334 to reconcile or update customer and financial records and ensure the intermediate banking services and the core banking services reflect the same data.

An exemplary transaction flow through FI architecture 300 can include a customer device 320 sending new transaction data to FI 330 over network 302 (e.g., over a payment channel or rail). In this example, customer devices 320 represent registered devices associated with a given customer's account at FI 330, which can include devices such as computers, laptops, tablets, mobile phones, portable electronic devices, and so on. Intermediary settlement platform 340 uses transaction intercepts 342 to monitor payment rails in network 302 (via payment rails 344) and intercept or receive a new transaction request. As discussed above, in one example, transaction intercepts 342 identify the new transaction request based on a new transaction identifier such as a check balance message, flag, or indication. Once intercepted, transaction intercepts 342 send the new transaction request and associated transaction data to MMFD module 360 to perform a predicted transaction settlement and execute corresponding the fraud prevention and intervention processes. In general, MMFD module 360 compares the new transaction data to customer profiles 350 and performs appropriate fraud interventions for fraudulent transactions. If no fraud is detected, MMFD module 360 will facilitate transferring money from a given customer account (e.g., accounts 348) to settle the legitimate transaction. For example, settling the legitimate transaction can include MMFD module 360 reconciling intermediate core banking services at intermediary settlement platform 340 with the analogous core banking services 344 (shown in the dash line box). However, as discussed in greater detail below, if MMFD module 360 detects fraud it will facilitate one or more fraud interventions.

Figure 4:
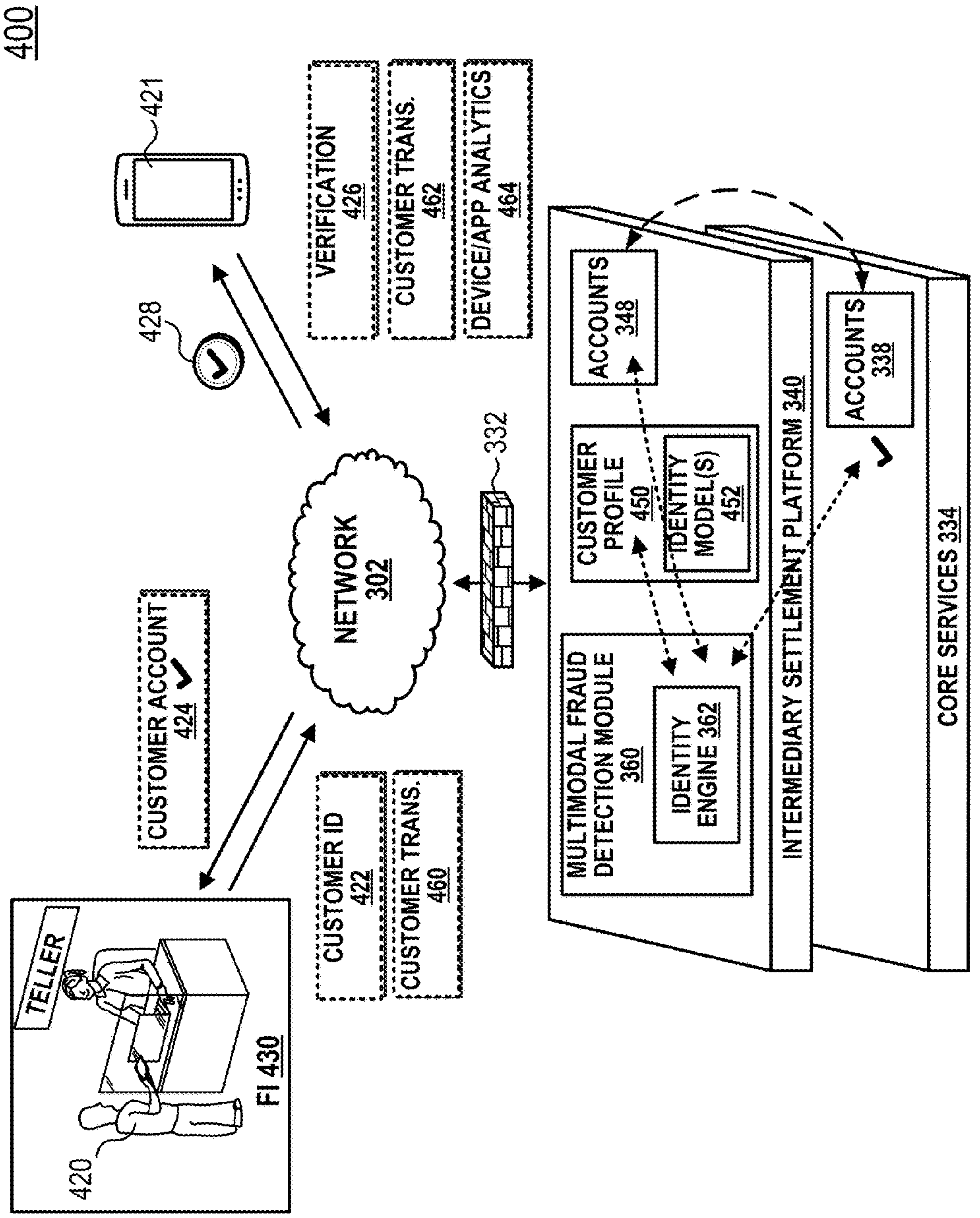
FIG. 4 illustrates a schematic diagram of customer account setup and device enrollment and fraud detection operations performed by the intermediary platform shown in FIG. 3.

FIG. 4 illustrates a schematic diagram 400 showing an exemplary process for customer account setup and device enrollment at a financial institution (FI) 430. At a high level, a customer 420 initially provides required identification information to a bank teller at a Financial Institution (FI) 430 to setup the customer account (e.g., saving, checking, credit, etc.). For device enrollment, customer 420 can register a mobile device 421 with FI 430 by providing some or all of the required identification information, which information was used during the customer account setup, and once verified, FI 430 associates mobile device 421 with the corresponding customer account(s).

Initial Account Setup

In detail, customer 420 opens a new account with FI 430 by providing appropriate customer identification data 422 to satisfy Know Your Customer (KYC) rules and regulations. Customer 420 provides identification documents to FI 430 (e.g., a bank teller). FI 430 then converts the identification documents into customer identification data 422 (e.g., scanned documents) and transmits customer identification data 422 over a network 302 to the FI's intermediary settlement platform 340 and/or core services 334. It is appreciated that KYC rules generally require FIs to collect and verify customer information such as personal details, address, phone numbers, social security numbers, employment history, financial history, etc. and accordingly, customer identification data 422 can represent unique customer identification information obtained from government issued licenses, IDs, passports, utility bills, and so on. It is also appreciated that customer identification data 422 can also represent unique account authentication and authorization data such as usernames, passwords, PINs, biometric data (e.g., fingerprints or facial recognition), and the like. Notably, it is also appreciated that customer 420 can electronically provide customer identification data 422 to FI 430 over network 302.

In some examples, core services 334 receives customer identification data 422 through firewall 332, creates a new customer account (e.g., represented by accounts 338), associates customer identification data 422 with the new customer account, and returns corresponding customer account data 424 to customer 420. As shown, the illustrated checkmarks associated with the new customer account (e.g., accounts 338 in core services 334) and customer account data 424 confirm FI 430 complied with KYC and related anti-theft and anti-money laundering rules, policies, and regulations.

In other examples, intermediary settlement platform 340 receives the customer request to setup a new customer account, receives customer identification data 422, creates the new customer account at the intermediary layer or digital core (e.g., represented by accounts 348), associates customer identification data 422 with the new customer account, and returns customer account data 424 to customer 420.

In each of the above examples, intermediary settlement platform 340 and core services 334 cooperate and communicate to reconcile and update the new customer account information in both network layers/platforms (e.g., accounts 348/accounts 338). Moreover, in the above examples, intermediary settlement platform 340 begins building predictive customer identity behavior models or identity models 452 based on customer interactions with FI 430.

Device Enrollment

FIG. 4 also shows customer 420 enrolling or registering a new device—namely, a mobile device 421—for the customer's account. For new device registrations, mobile device 421 provides verification data 426 that corresponds to portions of customer account data 424 to satisfy KYC rules (e.g., social security numbers, biometric data, personal details, government issued license information, PINs, usernames, passwords, etc.). In one example, mobile device 421 downloads an application or "app" associated with FI 430, and the app communicates verification data 426 over network 302 to core services 334 and/or intermediary settlement platform 340. Core services 334 and/or intermediary settlement platform 340 then compare(s) verification data 426 to the corresponding portions of customer account data 424 and once verified, core services 334 and/or intermediary settlement platform 340 send(s) a trust token 428 to mobile device 421 for subsequent authentication. FI 430 can also employ Two-Factor Authentication (2FA) protocols, which require two forms of identification before mobile device 421 can access and authorize transactions regarding the new customer account. In addition, customer 420 can register more than one device for the new customer account and, as discussed herein, intermediary settlement platform 340 can assign one of the customer's registered devices as a primary or anchor device for fraud interventions and interactions (e.g., alerts, push notifications, SMS texts, fraud-related chat messaging, etc.). In some examples, intermediary settlement platform 340 will prioritize providing fraud notifications, alerts, and interactions with the customer's primary or anchor device. Importantly, intermediary settlement platform 340 begins building corresponding identity models 452 based on customer interactions with each new device (e.g., mobile device 421).

Comprehensive Customer Identity Behavior Models

As discussed, MMFD module 360 generally analyzes customer behavior for multiple modes or transaction types, quantifies the fraud risk for every customer transaction, and further performs and facilitates fraud interventions. In operation, MMFD module 360 intercepts or receives transaction data corresponding to all customer transactions over network 302 and creates a comprehensive and unique customer profile 450 associated with customer 420.

As shown, the transaction data collectively includes customer transaction data 460, which is associated with in-person transactions, customer transaction data 462, which is associated with device transactions, and device/app analytic data 464, which can include device specific data (e.g., device IDs, International Mobile Equipment Identity (IMEI), Operating System (OS) version, model, make, manufacturer, device capabilities, sensor data, network carrier, IP address, etc.) as well as application data (e.g., application version, user interactions and engagement, user demographics, conversion rates, user behavior, user preferences, performance, etc.).

MMFD module 360 and more specifically, identity engine 362, contextualizes the customer's behavior for each transaction by converting and quantifying at least a portion of the transaction data into behavior metrics according to dimensions of one or more identity models 452 in customer profile 450. In one example, identity engine 362 develops neural networks and employs machine learning techniques to transform and quantify the customer's transaction data for legitimate transactions into expected or typical behavior metrics represented by identity models 452. Additionally, as discussed in greater detail below, identity engine 362 quantifies and transforms new transaction data for subsequent transactions into a new behavior vector and compares the new behavior vector to the expected or predicted behavior metrics. Identity engine 362 further generates a predicted fraud score based on the differences between the new behavior vector and the expected behavior metrics represented by identity models 452.

In this fashion, the predicted fraud score represents a degree that the new transaction data for a given customer comports with (or diverges from) typical or predicted customer behavior. Depending on the degree of conformance or divergence, which may be compared to a preset fraud threshold, MMFD module 360 settles the new transaction or performs fraud interventions. Importantly, while some example embodiments discuss an exemplary process for transforming new transaction data into a new behavior vector, it is appreciated that identity engine 362 can quantify and transform the new transaction data into behavior metrics appropriate for the context of a corresponding neural network, which can include vectors, matrices, scalar outputs, probability distributions, images, other complex data structures or datasets, and so on.

Figure 5:
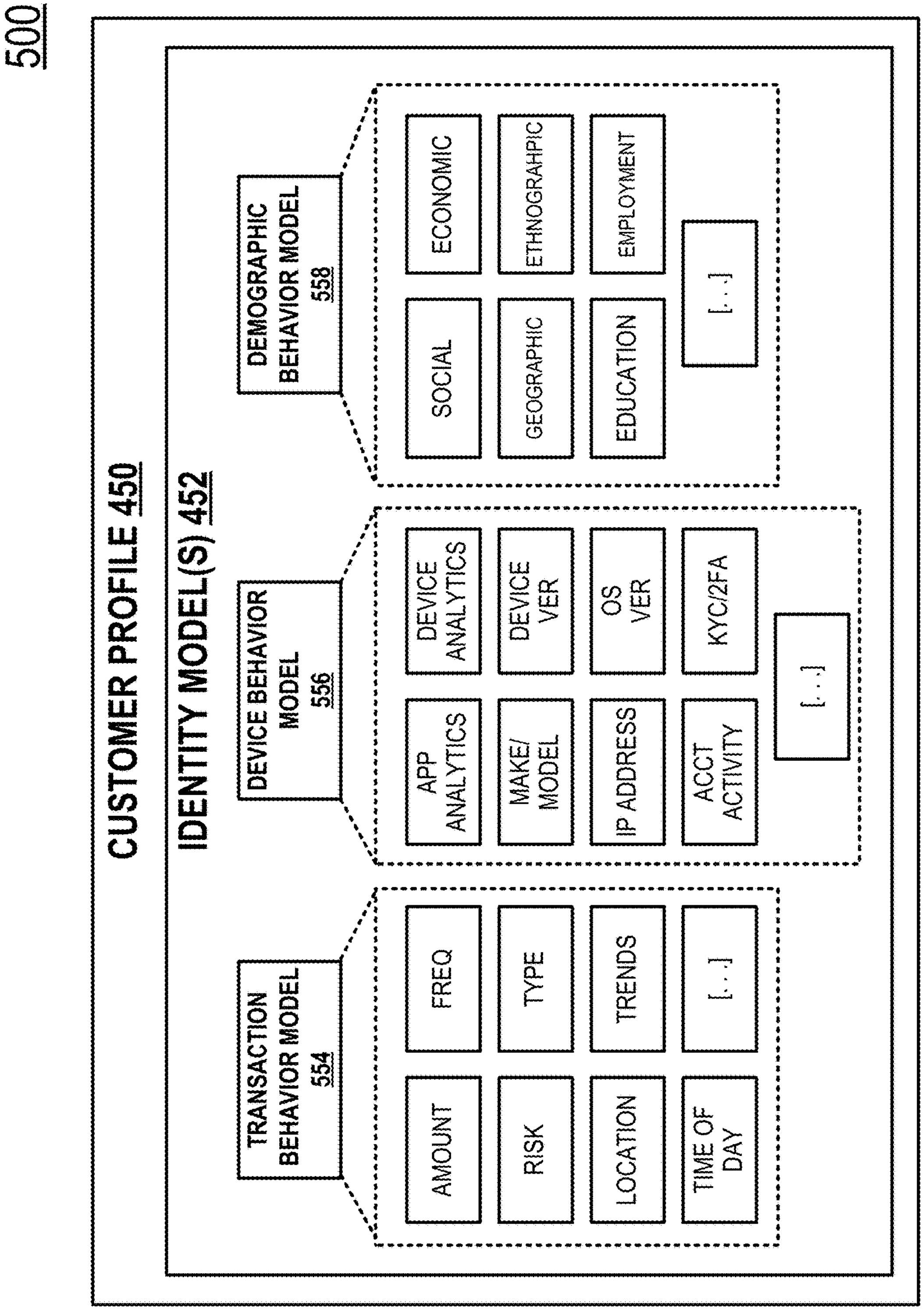
FIG. 5 illustrates a schematic diagram of an example customer profile, including predictive identity behavior models.

FIG. 5 illustrates a schematic diagram 500 of an example customer profile 450. As shown, customer profile 450 includes various identity models 452 that represent behavior models for predicting transaction fraud. The illustrated identity models 452 organize metrics or dimensions of customer behavior according to different behavior contexts, which include a transaction behavior model 554, a device behavior model 556, and a demographic behavior model 558.

Transaction behavior model 554 represents a customer's behavior for a given transaction and evaluates behavior metrics corresponding to a transaction amount, frequency, risk, transaction type, location, trends, time of day, and so on. Device behavior model 556 represents a customer's behavior for registered customer devices and evaluates behavior metrics corresponding to application analytics, device analytics, make/model, device version, IP address, OS version, account activity, KYC/2FA, and so on. Demographic behavior model 558 represents similarly situated customers and evaluates behavior metrics in the context of demographic data such as social, economic, geographic, ethnographic, education, employment, and so on.

Identity models 452 collectively correlate transaction data across various transaction modes or payment rails to determine, predict, and account for the customer's unique collective behavior patterns across every transaction. For example, a customer may make regular in-person deposits of a certain quantity at a Financial Institution (FI) but schedule online payroll transactions for different quantities using a registered customer device (e.g., mobile phone, etc.). In this example, identity models 452 can capture and quantify the customer's behavior for the in-person deposits according to transaction behavior model 554 and the online transactions according to device behavior model 556.

Importantly, the illustrated identity models also quantify different aspects of the customer's behavior for the same transaction. In one example transaction, the customer's registered device sends money to another FI through a payment network such as Zelle and in this example, transaction behavior model 554 quantifies the customer's behavior with respect to the transaction data (e.g., an amount) and device behavior model 556 quantifies the customer's behavior or interactions with respect to a mobile application on the registered device.

Importantly, the MMFD module determines the degree of predicted fraud based on the similarity or deviation between the customer's "new" behavior metrics extracted from a new transaction and the customer's predicted behavior represented by identity models 452. In this fashion, the MMFD module predicts customer fraud based on the customer behavior across every transaction mode and performs fraud interventions that can prevent socially engineered fraud. While the illustrated identity models 452 represent exemplary behavior contexts, it is appreciated that identity models 452 can incorporate the behavior contexts into fewer models and/or delineate further behavior contexts in additional models.

Figure 6:
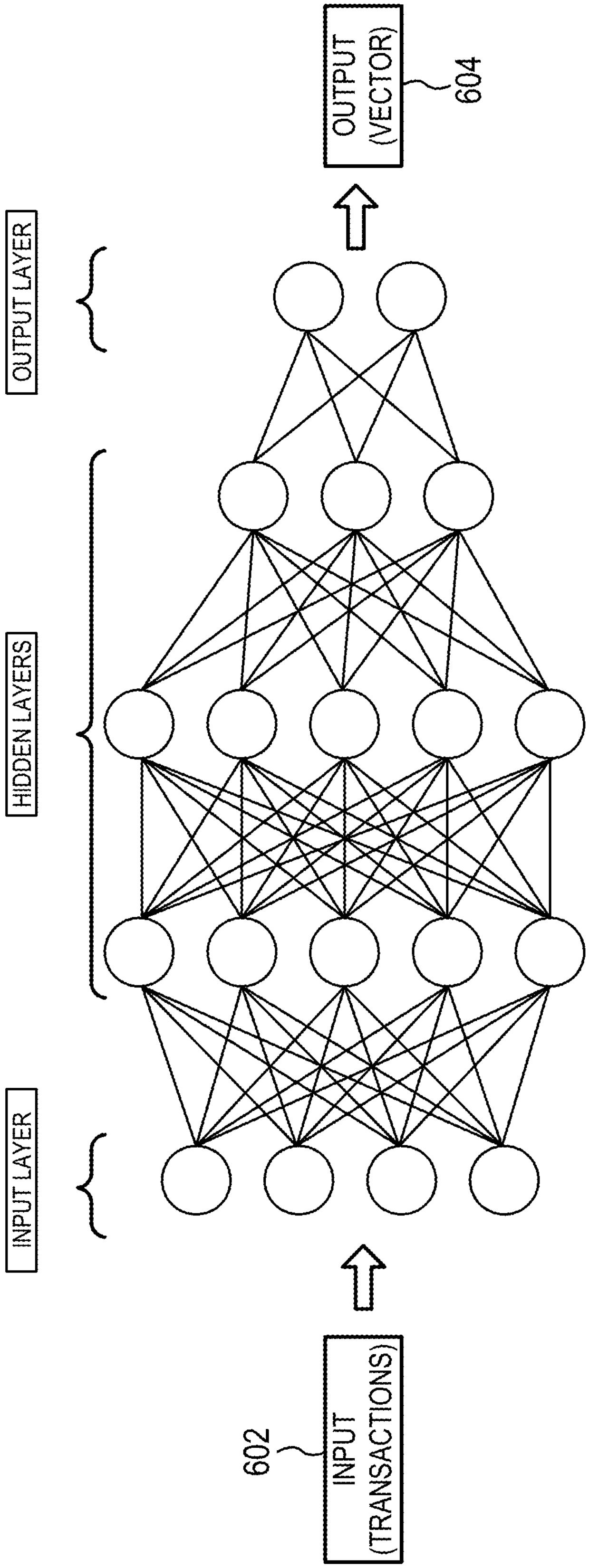
FIG. 6 illustrates a schematic diagram of an example neural network or a machine learning network configured to perform fraud detection operations.

FIG. 6 illustrates a schematic diagram of an exemplary machine learning process and a recurrent neural network (RNN) 600. As discussed, the MMFD module (discussed above) can employ machine learning techniques and neural networks such as RNN 600 to extract and transform a customer's transaction data into unique identity behavior models. RNN 600 represents an example machine learning network that includes an input layer, hidden layers, an output layer, and respective interconnected nodes that learn how to correlate an input (e.g., transaction data) with a corresponding output (e.g., customer behavior).

During training, RNN 600 encodes input behavior features in the input layer and the desired output features in the output layer. As one example, RNN 600 encodes exemplary features associated with respective identity models 452 in FIG. 5 (e.g., amount, frequency, time of day, etc.) as the input features for customer transactions and encodes whether each given transaction is legitimate or fraudulent as the output features. RNN 600 also applies activation functions in the hidden layers to extract information and develop dependent relationships between the features, optimize dependencies, and identify patterns between the encoded input features and output features. In some examples, the intermediary settlement platform develops a unique neural network for each respective identity behavior model in a customer profile.

After training, RNN 600 receives a transaction data for a new transaction as an input 602 and provides an output 604 (e.g., vectors, matrices, scalar outputs, probability distributions, images, etc.) that quantifies behavior metrics to capture the context of the transaction. It is appreciated RNN 600 provides an exemplary neural network that can be configured according to various network architectures (e.g., Long Short-Term Memory (LSTM), Gated Recurrent Unit (GRU), etc.), feedback mechanisms, parameter tuning, and so on. It is also appreciated that other types of neural networks such as a convolutional neural networks (CNNs), transformer neural networks, etc. can also be trained and employed to quantify transaction data in the context of customer behavior metrics and a predicted degree of fraud.

Figure 7:
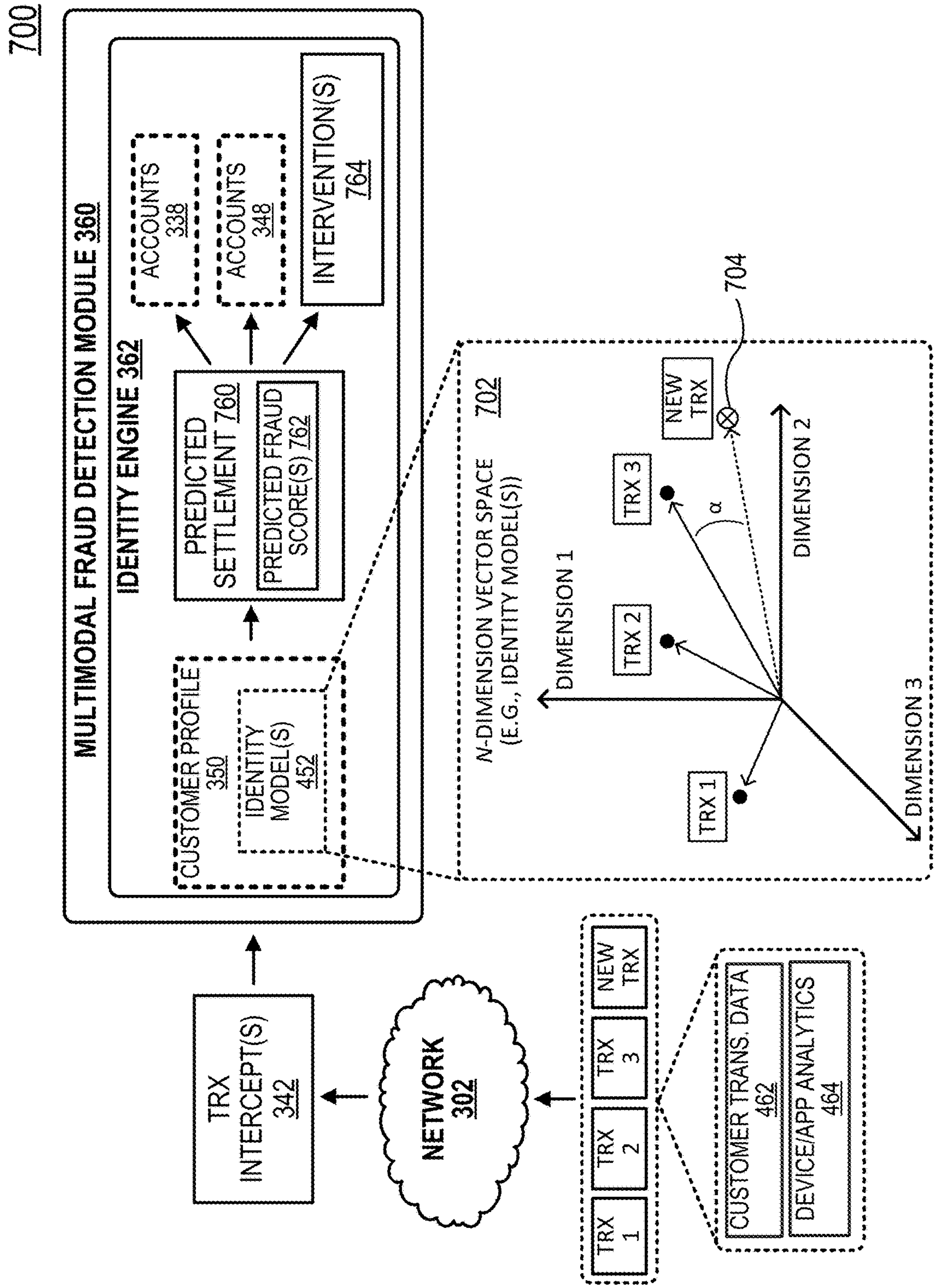
FIG. 7 illustrates a schematic diagram of the multimodal fraud detection module shown in FIG. 3, further showing an identity engine configured to perform fraud detection operations.

FIG. 7 illustrates a schematic diagram 700 showing portions of the intermediary settlement platform and operations performed by MMFD module 360 to create a unique customer profile, model customer behavior, and predict a degree of fraud for a new customer transaction. As shown, MMFD module 360 includes identity engine 362 and identity engine 362 further includes dash-lines boxes corresponding to customer profile 350, accounts 338, and accounts 348. In this example, the dash-lines indicate the modules are separate from but communicate with MMFD module 360/identity engine 362. However, as discussed, it is also appreciated that in other examples, the modules (and related functions) shown in dash-lines can be incorporated in MMFD module 360/identity engine 362.

In operation, transaction intercepts 342 monitor payment rails in network 302 and intercept customer transactions (e.g., based on a check balance indication/request) before the transactions reach the FI's core services (not shown). Here, transaction intercepts 342 intercept customer transaction data for an initial set of legitimate transactions-TRX 1, TRX 2, and TRX 3-which include transaction data such as customer transaction data 462 and device/app analytic data 464. Transaction intercepts 342 send the intercepted customer transaction data to MMFD module 360 where identity engine 362 employs machine learning techniques to build neural networks (discussed above) that transform the customer transaction data into one or more comprehensive identity models 452 associated with customer profile 350. For example, FIG. 7 also illustrates an N-dimensional vector space graph 702 that visually represents an example customer identity behavior model having dimensions that correspond to encoded, extracted, and transformed transaction data features or behavior metrics. As shown, the initial set of legitimate transactions TRX 1, TRX 2, and TRX 3 are represented in graph 702 as vectors plotted in the N-dimensional vector space.

Next, transaction intercepts 342 intercept a new transaction—NEW TRX—and again sends the corresponding customer transaction data to MMFD module 360. Notably, identity engine 362 includes a predicted settlement module 760 that executes NEW TRX at the intermediary settlement platform. Here, predicted settlement module 760 uses the neural networks for relevant identity models 452 to evaluate and transform the new transaction data into a new behavior vector based on the dimensions of the relevant identity behavior model. In this example, predicted settlement module 760 transforms the new transaction data for NEW TRX into a new vector 704 in the illustrated N-dimension vector space. Predicted settlement module 760 also determines a predicted fraud score 762 that quantifies a degree of conformity between new vector 704 (NEW TRX) and the vectors corresponding to the legitimate transactions TRX 1, TRX 2, TRX 3. In one example, predicted settlement module 760 quantifies the degree of conformity as a predicted fraud score by measuring the relative vector angles, distances, magnitudes, directions, divergences, convergences, etc.

Predicted settlement module 760 further compares the predicted fraud score(s) 762 to a fraud threshold(s) and if the predicted fraud score is below the corresponding fraud threshold, predicted settlement module 760 settles the new transaction (NEW TRX) and updates accounts 348 (intermediary settlement platform) and accounts 338 (core services). However, if the predicted fraud score is above the fraud threshold, predicted settlement module 760 performs one or more fraud interventions 764.

Figure 8:
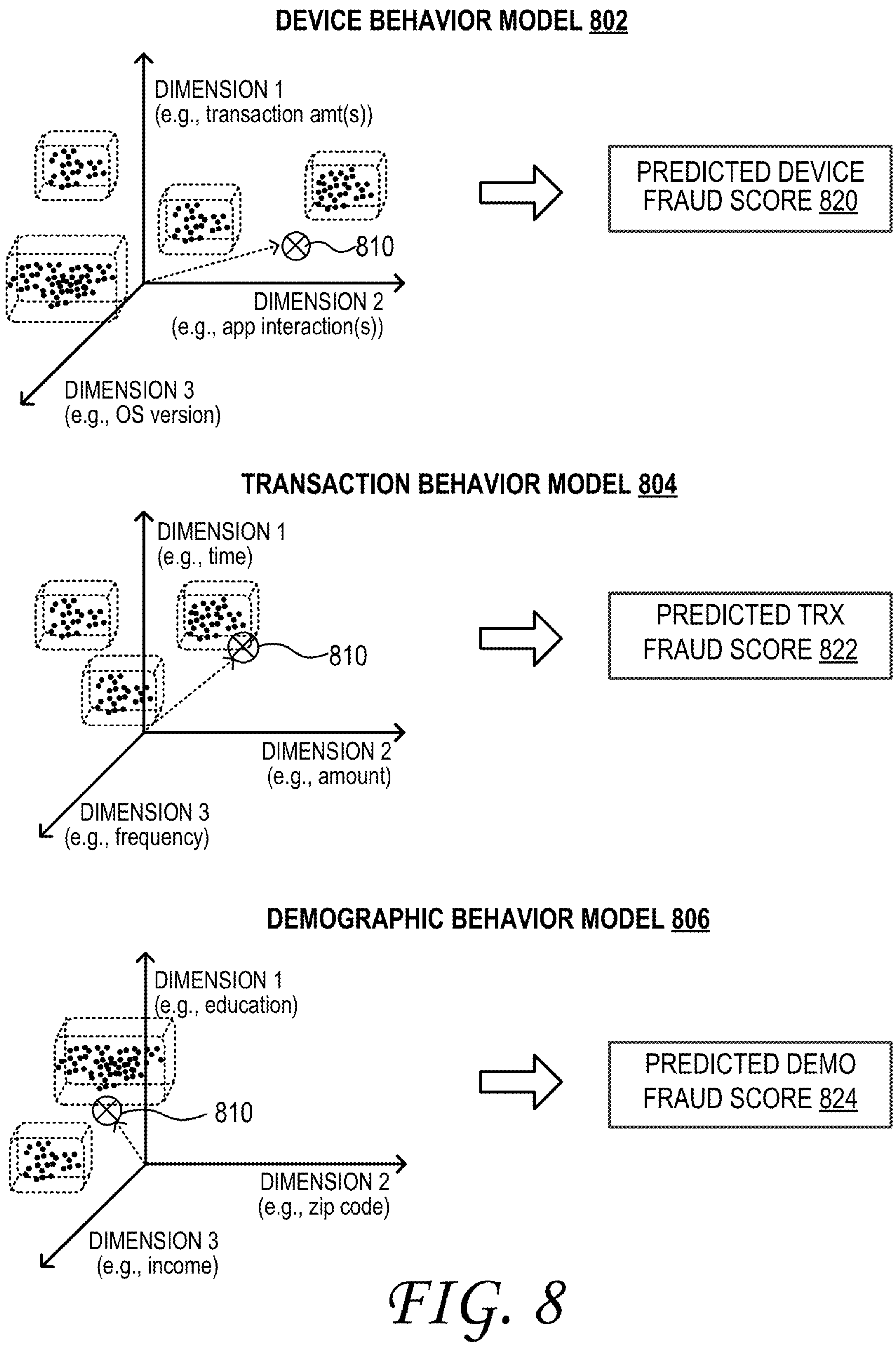
FIG. 8 illustrates graphical representations of predictive identity behavior models, including a device behavior model, a transaction behavior model, and a demographic behavior model.

Notably, in some examples, predicted settlement module 760 determines a predicted fraud score 762 for one or more identity models such as a transaction behavior model, a device behavior model, a demographic behavior model, and so on, resulting in corresponding predicted behavior fraud score(s) such as a predicted transaction fraud score, a predicted device fraud score, a predicted demographic fraud score, and so on (e.g., FIG. 8). In these examples, predicted settlement module 760 can aggregate the predicted fraud scores for each identity model into a composite fraud score that represents an average predicted fraud score. In other examples, the predicted settlement module 760 and/or MMFD module 360 can apply various weights, ranks, or otherwise normalize and/or scale the predicted fraud scores for individual or aggregate evaluation.

The illustrated fraud interventions 764 can include alerts, notifications, SMS texts, push notifications, contacting the customer, initiating a chat between an FI representative and the customer, denying the transaction, flagging the transaction for further review, and so on. In one example, MMFD module 360 assigns one of customer's registered devices as the primary or anchor device and in this example, interventions 764 prioritizes customer engagement through the anchor device by sends a push notification in a mobile application downloaded on that anchor device. The customer receives the push notification and then approves or denies the transaction through the mobile application on the anchor device. In the case of first party fraud where the predicted fraud scores for the device and identity models pass a fraud check, the transaction can be held in an interim settlement account that allow for the FI to contact the customer as they see fit. For example, if the respective predicted fraud scores are high in the context of the transaction model, but low in the context of the identity model, then MMFD module 360 can flag the transaction as a potential social engineering fraud or first party fraud, and further suggest a corresponding intervention 764 that requires a specific type of engagement by the FI with the customer.

FIG. 8 illustrates exemplary N-dimensional vector space graphs that visually represent behavior metrics quantified according to respective customer identity models, which can include a device behavior model 802, a transaction behavior model 804, and a demographic behavior model 806. Collectively, the vector space graphs provide black dots corresponding to legitimate or non-fraudulent transactions and a new vector 810 corresponding to a new transaction. In each graph, black dots for legitimate transactions generally conform to a predicted pattern of behavior in the relevant dimensions and are thus grouped inside dotted line boxes.

In operation, the MMFD module (e.g., MMFD module 360) evaluates and transforms the new transaction data into a new vector 810 according to the respective dimensions of the relevant identity model. The MMFD module further quantifies the degree of conformance or "closeness" between new vector 810 and the legitimate transactions to determine a predicted fraud score. For example, the degree of behavior conformance or predicted fraud can represent differences between new vector 810 and an individual transaction (e.g., next-closest) and/or differences between new vector 810 and an average of multiple transactions (e.g., groups/sub-groups of transactions). In the illustrated examples, the MMFD module generates a predicted fraud score for each identity behavior model, which includes a predicted device fraud score 820 for device behavior model 802, a predicted transaction fraud score 822 for transaction behavior model 804, and a predicted demographic fraud score 824 for demographic behavior model 806. In some examples, the MMFD module determines the degree of fraud for a given transaction by comparing the predicted fraud scores for each identity behavior model to a respective fraud threshold for that model. In addition or alternative, the MMFD module determines the predicted degree of fraud by aggregating the predicted fraud scores from multiple models into a composite fraud score and compares the composite fraud score to a composite fraud threshold. Notably, the MMFD module can further scale, weight, and prioritize the dimensions and/or resultant fraud scores.

Figure 9:
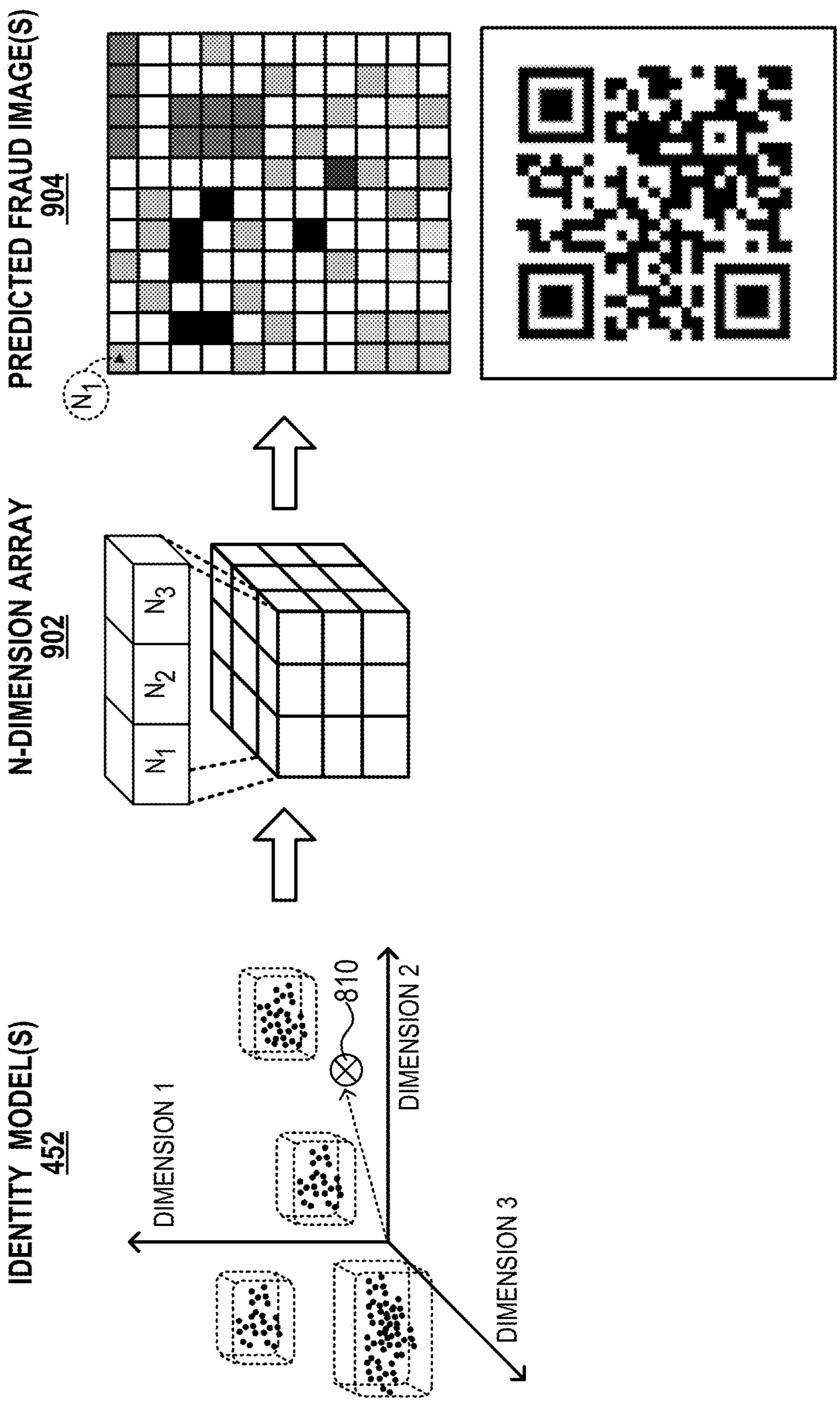
FIG. 9 illustrates an example process for transforming predicted fraud metrics into predicted fraud images.

FIG. 9 illustrates an example process for transforming predicted fraud metrics into predicted fraud images. In this example, the MMFD module transforms and assigns the transaction data features into an N-dimensional array 902, where each cell in the matrix represents a specific combination of dimensions and a corresponding value from the predictive identity model. Depending on the nature of the identity model output, the MMFD module can scale or normalize the values to a suitable range for image visualization. As shown, the MMFD module assigns each cell of the matrix to a corresponding pixel in the predicted fraud image.

In some examples, the MMFD module applies a color scheme and/or color gradient to the pixels based on the value in each cell. As one example, predicted fraud images 904 include a heat map having a cool-to-warm color scheme, where higher values are assigned "warmer" colors (e.g., red) and lower values are assigned to "cooler" colors (e.g., blue). In addition and/or alternative, the pixels of predicted fraud image(s) 904 can have a resolution or color gradient scheme that assigns different transparencies to ranges of values. In some examples, the usage, device, and activity data is algorithmically modeled as an image, where every user interaction results in a generated image for each user session. The data and generated images for non-fraudulent transactions will be used to fine tune a pre-trained large scale image model. In these examples the image model can be deployed to an edge device (e.g., a client device), run in a distributed computing environment or the cloud, and/or both. In operation, when the user interacts with a corresponding application associated with the FI, the system generates an image and interrogates a model API that ultimately returns a result/score for that image as anomalous (or not). As another example, predicted fraud images 904 can include a quick response (QR) code, where the resolution of the QR code corresponds to the predicted degree of fraud for a given transaction. It is appreciated that the illustrated predicted fraud image(s) 904 are examples for representing the results of the identity models as an image and other visualization techniques like scatter plots, bar charts, 3D plots, and so on may also be used.

Figure 10:
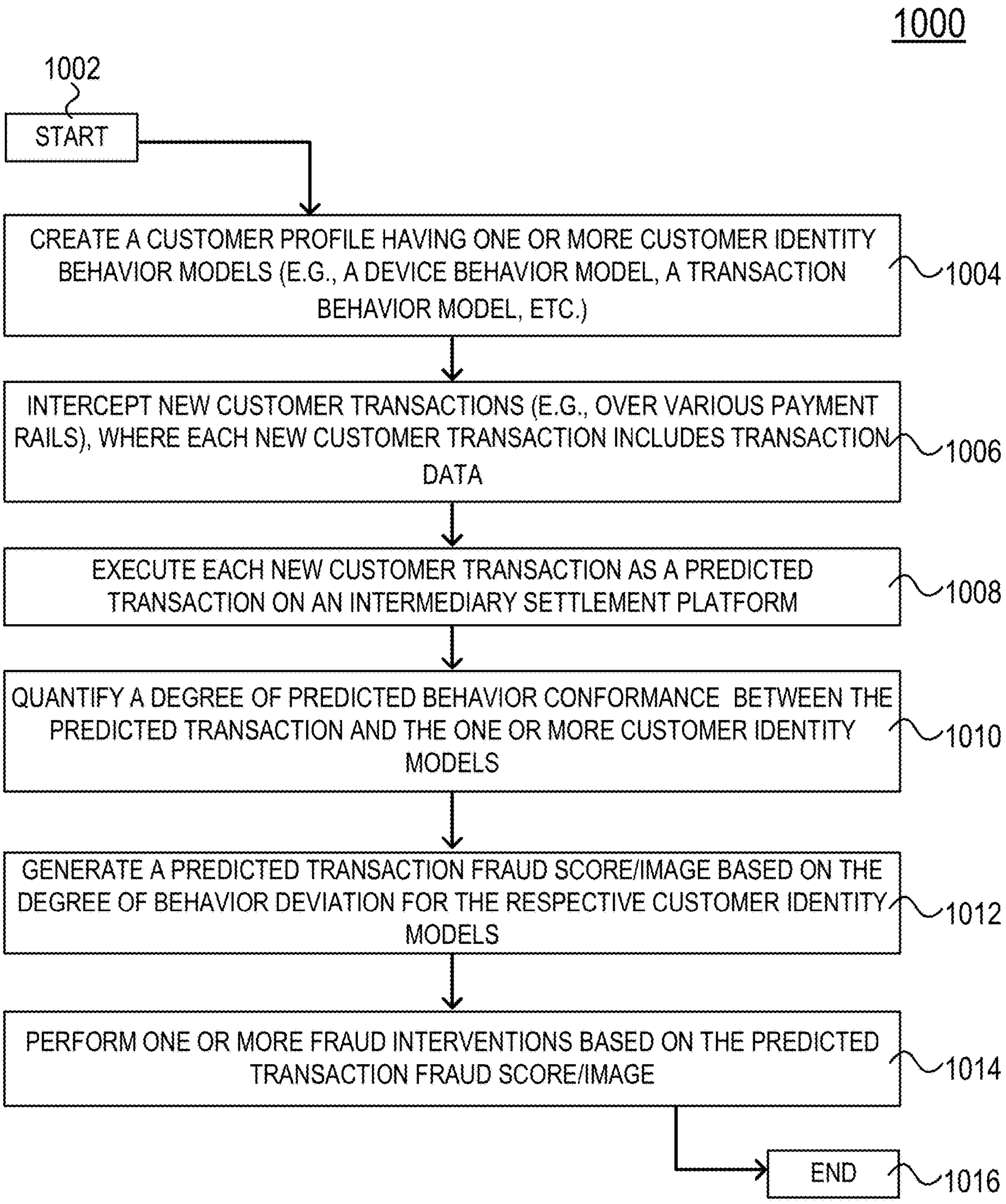
FIG. 10 illustrates an example simplified procedure for detecting and preventing fraud by an intermediary platform or digital core.

FIG. 10 illustrates a schematic diagram of an exemplary multimodal fraud detection process 1000, which may be performed by an intermediary settlement platform (e.g., intermediary settlement platform 340 shown in FIG. 3) and/or one or more modules associated with the platform such as an MMFD module (e.g., MMFD module 360). For discussion below, process 1000 is described in the context of operations performed by the MMFD module.

Process 1000 begins at step 1002 and continues to step 1004 where the MMFD module creates a customer profile (e.g., on an intermediary settlement platform) that includes one or more customer identity behavior models. As discussed, the customer identity behavior models quantify and represent predicted customer behavior and can include device behavior models, transaction behavior models, demographic behavior models, and so on. In this example, the MMFD module employs machine learning and neural networks to create the customer identity behavior model(s) and quantify behavior metrics for legitimate customer transactions.

Next, in step 1006, the MMFD module receives or intercepts a new customer transaction associated with a payment rail or transaction mode. For example, the MMFD module can employ intercept modules or functions that redirect new customer transactions based on identifiers associated with the corresponding transaction data (e.g., "check balance" indications, customer account information, registered device information, etc.). Notably, in this example, the transaction data includes the same type of data as the above discussed customer transaction data 460, customer transaction data 462, and/or device/app analytic data 464 (ref. FIG. 4).

Steps 1008, 1010, and 1012 collectively describe MMFD module operations for executing each new customer transaction at the intermediary settlement platform as a predicted or trial transaction (step 1008), quantifying a degree of predicted behavior conformance (e.g., similarity/deviation) between the predicted transaction and the customer identity models (step 1010), and generating a predicted transaction fraud score/image based on the same (step 1012). As discussed, the intermediary settlement platform can include intermediate core banking services that provide the same and/or analogous data and functions as "core services" of an FI to perform predicted or trial transactions settlements at the intermediary settlement platform without disrupting the core services (e.g., ref. FIG. 3). In addition, the MMFD module can quantify a degree of behavior conformance, which can include a degree of similarity or deviation, between the customer's behavior for the predicted transaction and the customer's behavior for historical legitimate or non-fraudulent transactions represented by the customer identity models. Preferably, the MMFD module employs machine learning techniques and neural networks to create comprehensive customer identity behavior models that extract, transform, and quantify the customer's transaction data into behavior metrics and dimensions. At step 1010, the MMFD module executes the predicted transaction using the trained neural networks associated with the customer's identity behavior models, which quantify the degree of behavior conformance between the customer's behavior metrics associated with legitimate transactions and the customer's behavior metrics associated with the predicted transaction. As discussed, the MMFD module can also normalize, scale, rank, prioritize, etc., the degrees of difference. Next, in step 1012, the MMFD module generates a predicted transaction fraud score (or image) based on the quantified degree of behavior conformance. For example, the MMFD module can generate a predicted fraud score or image for each customer identity model and/or generate a composite or aggregate predicted fraud score/image for multiple customer identity models.

In step 1014, the MMFD module further performs one or more fraud interventions based on the predicted transaction fraud score or image. In some examples, the MMFD module compares the predicted transaction score to a fraud threshold and executes appropriate fraud interventions when the predicted transaction score is above (or below) the threshold. In some examples, the MMFD module determines whether or not to perform fraud interventions based on the resolution of a predicted transaction fraud image. As discussed, the fraud interventions can include alerts, notifications, SMS texts, push notifications, contacting the customer, initiating a chat between an FI representative and the customer, denying the transaction, flagging the transaction for further review, and so on. If the predicted transaction score indicates the predicted transaction is legitimate or non-fraudulent, the MMFD module further settles the transaction and reconciles the appropriate customer account data, ledger, etc. with the analogous data stored in the core services. The MMFD module further updates the corresponding customer identity models to include the customer behavior for the new legitimate transaction.

As shown, process 1000 ends at step 1016 but it may continue on to step 1002 where, as discussed above, the MMFD module creates (or updates) an intermediary customer profile on the intermediary settlement platform. It should be noted that certain steps within process 1000 may be optional, and further, the steps shown in FIG. 10 are merely examples for illustration-certain other steps may be included or excluded as desired. Further, while a particular order of the steps is shown, this ordering is merely illustrative, and any suitable arrangement of the steps may be utilized without departing from the scope of the embodiments herein.

The fraud detection techniques described herein, therefore, provide an intermediary settlement platform that quantifies and models customer transaction data in the context of customer identity behavior models. The intermediary settlement platform intercepts new customer transactions and executes the new customer transaction as a predicted or trial settlement at the intermediary platform to determine a predicted degree of fraud before any money transfers from the customer account. In particular, the intermediary settlement platform transforms transaction data for new customer transactions into behavior metrics according to the dimensions of the customer identity behavior models, determines the degree of behavior conformance or the degree of predicted fraud between the new transaction and non-fraudulent transactions in the identity behavior models, and settles the transaction or performs fraud interventions based on the degree of predicted fraud.

While the fraud prevention techniques herein are described in the context of modules associated with an intermediary settlement platform, it is appreciated that the functions performed by the exemplary modules can be included (or excluded) as part of other modules or submodules as appropriate. It is also appreciated that while the customer identity behavior models are illustrated using exemplary N-dimension vector space graphs, the underlying neural networks that quantify the behavior metrics in these behavior models can include non-graphical outputs as well.

Exemplary aspects of this disclosure include:

Statement 1. A multimodal fraud prevention system having one or more network interfaces configured to communicate with one or more electronic payment rails over a network and one or more core services at a financial institution. In this example, the system includes a processor coupled to the network interfaces that is configured to execute instructions as well as a memory configured to store the instructions. The instructions are operable to cause the processor to create a customer profile having one or more customer identity behavior models that represent customer behavior associated with at least one registered device as well as the customer behavior associated with non-fraudulent or legitimate transactions. The instructions are further operable to cause the processor to receive or intercept transaction data associated with a new transaction and convert at least a portion of the transaction data into customer behavior metrics corresponding to dimensions of at least one customer identity behavior model. The instructions are further operable to cause the processor to quantify a degree of predicted behavior conformance (e.g., similarity and/or divergence) between the customer behavior metrics and at least one customer identity model and determine a predicted fraud score for the new transaction based on the same. The instructions are further operable to cause the processor to determine the predicted fraud score does not exceed a predetermined fraud threshold and settle the new transaction or determine the predicted fraud score exceeds the predetermined fraud threshold and perform one or more fraud interventions.

Statement 2. The multimodal fraud prevention system described in statement 1, wherein the one or more customer identity behavior models include a device behavior model representing the customer behavior associated with each registered device and a transaction behavior model representing the customer behavior associated with each non-fraudulent or legitimate transaction.

Statement 3. The multimodal fraud prevention system described in any one or more of the above statements, wherein the one or more customer identity behavior models include a plurality of identity behavior models, wherein the instructions are further operable to cause the processor to aggregate the predicted fraud score for each identity behavior model into a composite fraud score, and wherein when the instructions cause the processor to determine whether the predicted fraud score does or does not exceed the predetermined fraud threshold, the instructions are operable to cause the processor to determine the composite predicted fraud score does or does not exceed the predetermined fraud threshold.

Statement 4. The multimodal fraud prevention system described in any one or more of the above statements, wherein the instructions to convert at least a portion of the new transaction data into customer behavior metrics are further operable to cause the processor to employ a trained neural network to extract the customer behavior metrics from the new transaction data.

Statement 5. The multimodal fraud prevention system described in any one or more of the above statements, wherein the predicted fraud score includes one or more of a vector, a matrix, a scalar output, a probability distribution, or an image.

Statement 6. The multimodal fraud prevention system described in any one or more of the above statements, wherein the instructions to quantify the degree of predicted behavior conformance are further operable to cause the processor to determine at least one of an angle, a distance, a magnitude, a direction, a divergence, or a convergence between the customer behavior metrics for the new transaction and the customer behavior for at least one prior transaction represented by the one or more customer identity behavior models.

Statement 7. The multimodal fraud prevention system described in any one or more of the above statements, wherein the instructions to receive or intercept the transaction data associated with the new transaction are further operable to cause the processor to monitor the one or more electronic payment rails for a check balance request identify transaction data corresponding to the check balance request as the transaction data associated with the new transaction, and redirect the transaction data associated with the new transaction to the multimodal fraud prevention system.

Statement 8. The multimodal fraud prevention system described in any one or more of the above statements, wherein the instructions to determine the predicted fraud score are further operable to cause the processor to generate a predicted fraud image, wherein the predetermined fraud threshold corresponds to an image resolution, wherein the instructions to determine whether the predicted fraud score does or does not exceed the predetermined fraud threshold are further operable cause the processor to determine whether the predicted fraud image does or does not exceed the image resolution corresponding to the predetermined fraud threshold.

Statement 9. The multimodal fraud prevention system described in any one or more of the above statements, wherein the instructions are further operable to cause the processor to associate a customer account with a plurality of registered devices, assign one of the plurality of registered devices as a primary or anchor device, and prioritize performing one or more fraud interventions with respect to the primary device.

Statement 10. The multimodal fraud prevention system described in any one or more of the above statements, wherein the one or more fraud interventions include one or more alerts, notifications, SMS texts, push notifications, interactions with a customer, a chat between an FI representative and the customer, a denial of the transaction, or identifying the transaction requires further review.

Statement 11. The multimodal fraud prevention system described in any one or more of the above statements, wherein the instructions are further operable to cause the processor to reconcile customer account data between an intermediary settlement platform and one or more of the core services at a financial institution.

Additional aspects of this disclosure are set out in the above description. Features of one aspect may be applied to each aspect alone or in combination with other aspects and further, while certain operations are provided in a particular order, it is appreciated that such order is not required unless the context otherwise indicates. Finally, the foregoing description is directed to specific exemplary embodiments, however, it will be apparent that variations and modifications may be made to the described embodiments, with the attainment of some or all of their advantages. For instance, it is expressly contemplated that the components and/or elements of the disclosed multimodal fraud detection can be implemented in a platform, system, device, module, and so on, which can include software stored on a tangible (non-transitory) computer-readable medium, devices, and memories (e.g., disks/CDs/RAM/EEPROM/etc.) having program instructions executing on a computer, hardware, firmware, or a combination thereof. Further, processes and methods describing the disclosed functions and techniques can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A multimodal fraud prevention system, comprising:
one or more network interfaces configured to communicate with one or more electronic payment rails over a network;
a processor coupled to the one or more network interfaces;
an intermediary settlement platform having at least one module configured to communicate with the one or more electronic payment rails and the processor; and
a memory configured to store instructions, the instructions are executable by the processor and are operable to:
create a customer profile having one or more customer identity behavior models, the one or more customer identity behavior models represent expected customer behavior associated with at least one registered device and with non-fraudulent transactions;
receive transaction data associated with a new transaction;
convert at least a portion of the transaction data into new respective behavior metrics for corresponding dimensions of at least one customer identity behavior model;
quantify a degree of predicted behavior conformance between the new respective behavior metrics and the expected customer behavior for the corresponding dimensions of the at least one customer identity behavior model;
determine a predicted fraud score for the new transaction based on the degree of predicted behavior conformance; and
perform one or more fraud interventions when the predicted fraud score exceeds a predetermined fraud threshold, wherein the intermediary settlement platform communicates with the processor to perform the one or more fraud interventions before facilitating transaction settlement with one or more core services associated with a Financial Institution.

2. The multimodal fraud prevention system of claim 1, wherein the instructions to receive the transaction data are further operable to:
monitor the one or more electronic payment rails for a check balance request associated with the new transaction; and
direct the transaction data associated with the new transaction to the intermediary settlement platform based on the check balance request.

3. The multimodal fraud prevention system of claim 1, wherein the instructions to quantify a degree of predicted behavior conformance are further operable to:
determine a degree of divergence between the new respective behavior metrics and the expected customer behavior for the corresponding dimensions of the at least one customer identity behavior model.

4. The multimodal fraud prevention system of claim 1, wherein the instructions to quantify the degree of predicted behavior conformance are further operable to:
determine at least one of an angle, a distance, a magnitude, a direction, a divergence, or a convergence between the new respective behavior metrics and the expected customer behavior for the corresponding dimensions of the at least one customer identity behavior model.

5. The multimodal fraud prevention system of claim 1, wherein the instructions are further operable to:
facilitate settlement of the new transaction with the one or more core services associated with the financial institution when the predicted fraud score does not exceed the predetermined fraud threshold.

6. The multimodal fraud prevention system of claim 1, wherein the one or more customer identity behavior models include a plurality of customer identity behavior models,
wherein the predicted fraud score is a composite fraud score, and
wherein the instructions to determine the predicted fraud score for the new transaction are further operable to:
determine a plurality of predicted fraud scores associated with each customer identity behavior model, and
aggregate the plurality of predicted fraud scores to create the composite fraud score.

7. The multimodal fraud prevention system of claim 1, wherein the instructions to determine the predicted fraud score for the new transaction are further operable to generate a predicted fraud image, and wherein the predetermined fraud threshold represents an image resolution level.

8. The multimodal fraud prevention system of claim 1, wherein the predicted fraud score includes one or more of a vector, a matrix, a scalar output, a probability distribution, or an image.

9. The multimodal fraud prevention system of claim 1, wherein the instructions to convert at least a portion of the transaction data into new respective behavior metrics are further operable to employ a trained neural network to identify the respective behavior metrics from the new transaction data for the corresponding dimensions of the at least one customer identity behavior model.

10. A tangible, non-transitory, computer-readable media having instructions encoded thereon, the instructions are executable by a processor and are operable to:

create a customer profile having one or more customer identity behavior models, the one or more customer identity behavior models represent expected customer behavior associated with at least one registered device and with non-fraudulent transactions;

receive transaction data associated with a payment rail in a network, the transaction data corresponds to a new transaction;

convert at least a portion of the transaction data into new respective behavior metrics for corresponding dimensions of at least one customer identity behavior model;

quantify a degree of predicted behavior conformance between the new respective behavior metrics and the expected customer behavior for the corresponding dimensions of the at least one customer identity behavior model;

determine a predicted fraud score for the new transaction based on the degree of predicted behavior conformance;

perform one or more fraud interventions when the predicted fraud score exceeds a predetermined fraud threshold; and facilitate transaction settlement with one or more core services associated with a Financial Institution, wherein the instructions to perform the one or more fraud interventions are further operable to perform the one or more fraud interventions before facilitating the transaction settlement with the one or more core services.

11. The tangible, non-transitory, computer-readable media of claim 10, wherein the instructions are further operable to:

communicate with one or more electronic payment rails and one or more core services associated with the Financial Institution, and wherein the instructions to receive the transaction data are further operable to:

monitor the one or more electronic payment rails for a check balance request associated with the new transaction; and direct the transaction data associated with the new transaction to an intermediary settlement platform based on the check balance request.

12. The tangible, non-transitory, computer-readable media of claim 10, wherein the instructions to quantify a degree of predicted behavior conformance are further operable to:

determine a degree of divergence between the new respective behavior metrics and the expected customer behavior for the corresponding dimensions of the at least one customer identity behavior model.

13. The tangible, non-transitory, computer-readable media of claim 10, wherein the instructions to quantify the degree of predicted behavior conformance are further operable to:

determine at least one of an angle, a distance, a magnitude, a direction, a divergence, or a convergence between the new respective behavior metrics and the expected customer behavior for the corresponding dimensions of the at least one customer identity behavior model.

14. A method for preventing fraud, comprising:

creating, by a processor in communication with an intermediary settlement platform, a customer profile having one or more customer identity behavior models, the one or more customer identity behavior models represent expected customer behavior associated with at least one registered device and with non-fraudulent transactions;

monitoring, by the intermediary settlement platform, one or more electronic payment rails over a network for transaction data;

determining, by the processor in communication with the intermediary settlement platform, at least a portion of the transaction data is associated with a new transaction;

converting, by the processor, at least the portion of the transaction data into new respective behavior metrics for corresponding dimensions of at least one customer identity behavior model;

quantifying, by the processor, a degree of predicted behavior conformance between the new respective behavior metrics and the expected customer behavior for the corresponding dimensions of the at least one customer identity behavior model;

determining, by the processor, a predicted fraud score for the new transaction based on the degree of predicted behavior conformance;

performing, by the processor, one or more fraud interventions when the predicted fraud score exceeds a predetermined fraud threshold, wherein the intermediary settlement platform communicates with the processor to perform the one or more fraud interventions before facilitating a settlement of the new transaction with one or more core services associated with a Financial Institution; and facilitating the settlement of the new transaction with the one or more core services at the Financial Institution when the predicted fraud score does not exceed the predetermined fraud threshold.

15. The method of claim 14, wherein quantifying the degree of predicted behavior conformance further includes determining a degree of divergence between the new respective behavior metrics and the expected customer behavior for the corresponding dimensions of the at least one customer identity behavior model.

16. The method of claim 14, wherein the one or more customer identity behavior models include a plurality of customer identity behavior models, wherein the predicted fraud score is a composite fraud score, and wherein determining the predicted fraud score for the new transaction further includes:

determining a plurality of predicted fraud scores associated with each customer identity behavior model, and aggregating the plurality of predicted fraud scores to create the composite fraud score.

17. The method of claim 14, wherein determining the predicted fraud score for the new transaction further includes generating a predicted fraud image, and wherein the predetermined fraud threshold represents an image resolution level.

18. The method of claim 14, wherein the predicted fraud score includes one or more of a vector, a matrix, a scalar output, a probability distribution, or an image.

* * * * *